(12) United States Patent
Albrecht et al.

(10) Patent No.: US 6,479,795 B1
(45) Date of Patent: Nov. 12, 2002

(54) PORTABLE WELDING WIRE FEEDER AND HOUSING

(75) Inventors: Bruce P. Albrecht, Hortonville, WI (US); Donald R. Keddell, Appleton, WI (US); Richard J. Schuh, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/686,294

(22) Filed: Oct. 11, 2000

(51) Int. Cl.[7] ............................................... B23K 9/12

(52) U.S. Cl. ................... 219/137.2; 219/136; 219/137.7

(58) Field of Search ......................... 219/137.2, 137.7, 219/137.71, 137.9, 136, 72

(56) References Cited

U.S. PATENT DOCUMENTS

| | | | | | |
|---|---|---|---|---|---|
| 2,833,912 | A | * | 5/1958 | Royer | 219/137.9 |
| 3,309,497 | A | * | 3/1967 | Kensrue | 219/137.9 |
| 3,632,950 | A | * | 1/1972 | Berghof | 219/72 |
| 4,665,300 | A | * | 5/1987 | Bellefleur | 219/137.2 |
| 5,916,464 | A | * | 6/1999 | Geiger | 219/137.71 |
| 6,225,596 | B1 | * | 5/2001 | Chandler et al. | 219/137.71 |

* cited by examiner

Primary Examiner—Clifford C. Shaw
(74) Attorney, Agent, or Firm—Mark W. Croll; John H. Pilarski

(57) ABSTRACT

A modular portable welding wire feeder housed in an instrument case and a method of modifying an instrument case to house a welding wire feeder are disclosed. The modular portable wire feeder includes a chassis assembly conveniently mounted inside of the instrument case housing. The instrument case includes welding input interfaces disposed to receive welding inputs and welding output interfaces disposed to provide welding outputs.

37 Claims, 7 Drawing Sheets

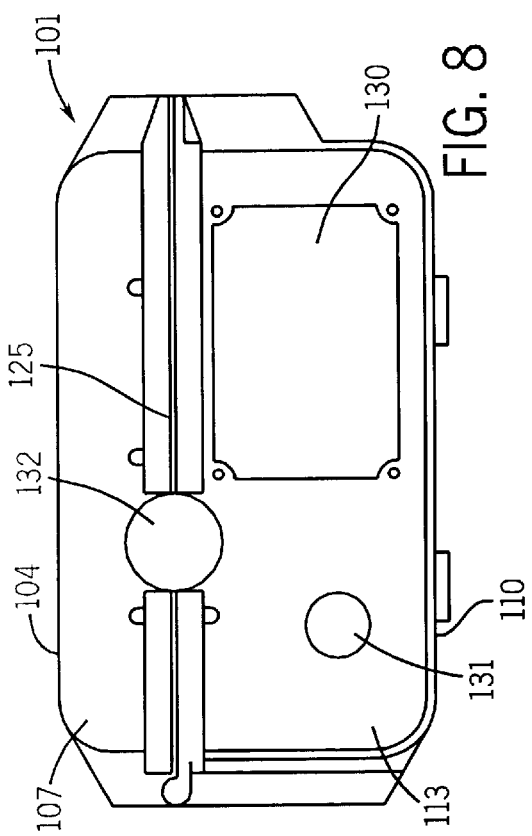
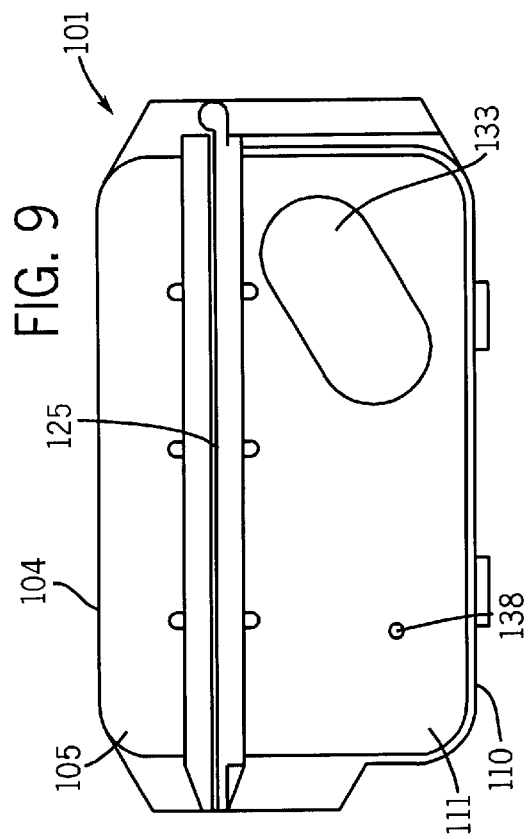
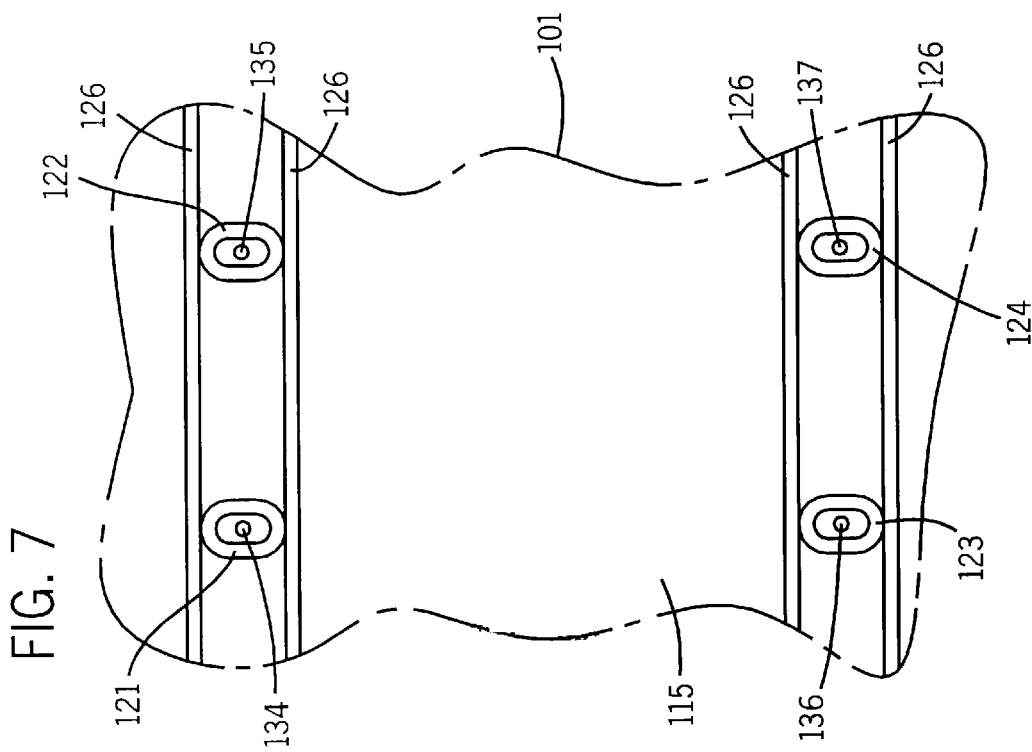

PORTABLE WELDING WIRE FEEDER AND HOUSING

FIELD OF THE INVENTION

The present invention relates generally to welding wire feeders. More specifically, it relates to a modular portable welding wire feeder housed in an instrument case and a method of modifying an instrument case to house a welding wire feeder.

BACKGROUND OF THE INVENTION

Housings for welding wire feeders are typically made from either metal or plastic. Non-portable wire feeders, for example, typically have metal housings made from sheet metal. The sheet metal is bent and punched to form a custom housing for each wire feeder model. These non-portable wire feeders are generally used indoors at a single location.

Portable wire feeders, on the other hand, typically have handles and are transported from location to location. Portable wire feeders are generally used outdoors where they are exposed to the elements. This is especially true in the ship building and construction industries. Plastic housings are ideally suited for this type of usage because they are impact and corrosion resistant. Plastic housings also act as an electrical insulator between the internal wire feeder components and the external working environment such as the metal on ships.

Plastic housings for welding wire feeders have typically been custom made using rotational molding techniques, although injection molding and compression molding have also been used. Rotational molding is desirable over injection and compression molding because of the lower tooling costs involved. Typical wire feeder sales volumes do not justify high tooling costs.

Prior art custom wire feeder housings made using rotational molding typically include a three dimensional main housing portion (e.g. base) and a cover that is substantially flat (e.g. substantially two dimensional in shape). A large opening is cut into one side of the main portion of the housing to allow for access to the wire feeder components. The cover is hinged to the main portion and closes the opening. One such prior art wire feeder that uses this type of housing is the S-22P12 wire feeder manufactured by Miller Electric Mfg Co., Appleton Wis.

Rotationally molded housings suffer from many drawbacks, however. Rotationally molded parts, for example, vary greatly from part to part due to uncontrollable warpage and shrinkage. The various parts that make up a complete housing (e.g. the cover and main housing portion), as a result, do not necessarily fit well together. Assembling these housings is difficult and the overall quality of the housing is affected.

Rotationally molded housings are also not as sturdy as comparable housings made using injection or compression molding. The covers, for example, tend to be flexible and flimsy making it difficult to tightly seal the mating seam between the cover and the base. These housings are less sturdy in part because different polymers are used in rotational molding as compared with injection and compression molding. It is also easier to mold reinforcing structures into housings made form injection molding or compression molding, such as reinforcement ribs.

Other problems with rotationally molded housings include the large cycle time involved in making rotationally molded parts and the numerous secondary operations, such as machining operations, that are required to add holes to these parts.

As an alternative to rotational molding, some prior art custom made wire feeder housings have been molded using injection molding or compression molding. Custom housings produced using these techniques have the potential to be much more rugged and of higher quality than those made using rotational molding.

The drawback to using these molding techniques, however, lies in the high cost of the tools that are required. An injection molding tool for a custom molded wire feeder housing can cost hundreds of thousands of dollars. Such a high cost typically cannot be justified given the typical sales volumes for welding wire feeders.

In those situations where injection or compression molding have been used, only the main portions of the housing have been injection molded (e.g. the base and the cover). These housing parts have typically been simple in design to keep tooling costs to a minimum. The remaining parts of the housing, such as handles, latches, and hinges, have traditionally been made of metal to further reduce tooling costs for the overall feeder housings.

It is desirable to have a plastic housing for a welding wire feeder that is as rugged and well made as those made using injection molding or compression molding. Preferably the housing can be made without incurring the high cost of tooling that is associated with these types of molding processes.

Injection molded off-the-shelf instrument cases (and tool boxes) for use in a wide variety of applications are commercially available from numerous manufacturers. These cases are available in many different sizes. The various components of these instrument cases, such as the cover and the base, the handle, the latches, and the hinges are all typically molded using injection molding or compression molding techniques.

Many of these components are molded as integrated parts. For example, the hinges are integrally molded as part of the base and the cover. Both the cover and the base include sidewalls and are three dimensional in shape. Reinforcement ribs are also integrally molded into the cover and base portions of the case. These cases are very rugged and of high quality.

Using injection molding or compression molding to create these cases is cost justifiable because these cases are marketed for use in a wide variety of applications and industries. These cases are typically used for carrying or storing instruments and equipment of all kinds, including tools, cameras, computers, measurement equipment and testing equipment. A large quantity of these cases are sold as a result.

The particular instrument or apparatus carried in these cases is typically removed from the case for use outside of the case. Alternatively, access to an instrument is provided by opening the case and the instrument is used while in the case but with the case open.

Instruments stored or carried in these cases are generally not used with the case closed (e.g. the case is not used as a housing). This is because these cases as commercially sold off-the-shelf do not allow for the instrument to be used with the case closed. There is typically no way to access the instrument with the case closed. Also, there is no way to provide inputs to the instrument or to receive outputs from the instrument with the case closed.

It is desirable, therefore, to modify these injection molded, rugged, high quality, instrument cases to house a welding wire feeder. Preferably, the case is modified to house the various wire feeder components inside and to allow for operation of the wire feeder with the case closed. The instrument case is also preferably modified to receive the various wire feeder inputs and to provide the various wire feeder outputs while the case is closed.

It is also desirable to have portable wire feeders that are small, lightweight, and easily transported. In the ship building industry, for instance, it is desirable to have a portable wire feeder that is sized to fit through the port hole of a ship. Preferably, these wire feeders weigh 25 pounds or less (excluding the weight of the spool of weld wire). Lightweight instrument cases are also well suited for this purpose.

Another problem with prior art wire feeders in general is that they are difficult to service and repair, especially in the field. Typically, the various wire feeder components (e.g. wire drive assemblies, spool supports, circuit boards, gas valves, etc . . . ) in prior art wire feeders are separately mounted inside of the wire feeder housing each with its own set of fastening hardware. Removal of these components is difficult and time consuming because a large number of fasteners must be removed. Also, some of these fasteners are difficult to reach inside of the housing. These components, as a result, are left in the wire feeder housing during initial testing and servicing of the overall wire feeder. This makes servicing of prior art wire feeders difficult. This is especially true in the case of portable wire feeders which are typically small and compact in size.

Replacing a damaged prior art wire feeder housing is also difficult because each of the various wire feeder components must be individually removed from the damaged housing and remounted in the new replacement housing. Finally, it is also difficult to design new housings for these prior art wire feeders to meet specific customer requirements. This is because the various wire feeder components are typically mounted directly to the inside of the housing itself which makes for a complicated housing design.

It is desirable, therefore, to have a wire feeder that is easily serviced and repaired. It is also desirable to have a wire feeder housing that is easy to replace when damaged. Preferably, such a wire feeder is modular in construction. All or most of the various wire feeder components are preferably assembled into a single chassis assembly. The chassis assembly, in turn, is preferably mounted to the inside of the housing in a simple and uncomplicated manner using a minimal number of fasteners. The chassis assembly preferably can be easily and quickly removed from the housing as a single unit during testing, servicing or housing replacement.

SUMMARY OF THE PRESENT INVENTION

According to a first aspect of the invention, a portable welding wire feeder includes an instrument case. A spool support and a wire drive assembly are mounted in the instrument case. The spool support is disposed to support a spool of weld wire. The wire drive assembly is disposed to receive the weld wire from the spool and provide the weld wire to a welding gun.

A chassis assembly is mounted to the instrument case in one embodiment and includes the spool support and the wire drive assembly. The instrument case includes at least one welding input interface disposed to receive a welding input in one embodiment. In an alternative embodiment, the instrument case includes at least one welding output interface disposed to provide a welding output. The portable welding wire feeder includes a control panel mounted on the outside of the instrument case in yet another embodiment.

A weld power delivery device is mounted in the instrument case in one embodiment. The weld power delivery device is disposed to receive weld power from a welding power supply and provide the weld power to the welding gun.

The instrument case includes a welding gun interface in one embodiment and the wire drive assembly is disposed to provide the weld wire to the welding gun through the welding gun interface. In another embodiment, the instrument case includes a cover and a base connected to the cover. The cover and the base open and close along a mating seam. The welding gun interface interrupts the mating seam in this embodiment.

The portable welding wire feeder is capable of operation with the instrument case closed in yet another embodiment.

According to a second aspect of the invention, a housing for a portable welding wire feeder includes an instrument case having a cover and a base connected to the cover. The cover and the base open and close along a mating seam. The instrument case includes at least one welding input interface disposed to receive a welding input and at least one welding output interface disposed to provide a welding output.

The at least one welding input interface includes a weld power interface disposed to receive weld power from a welding power source in one embodiment. The at least one welding output interface includes a welding gun interface disposed to provide welding power to a welding gun in a second embodiment. The welding gun interface interrupts the mating seam in another embodiment.

The at least one welding input interface includes a shielding gas interface in one embodiment. The shielding gas interface is disposed to receive shielding gas from a source of shielding gas. A control panel interface is provided on the instrument case in a third embodiment. The control panel interface is disposed to receive a control panel in this embodiment.

According to a third aspect of the invention, a method of modifying an instrument case to house a welding wire feeder includes adapting the instrument case to hold a spool support and a wire drive assembly. The spool support is disposed to support a spool of weld wire. The wire drive assembly is disposed to receive the weld wire from the spool and provide the weld wire to a welding gun.

The instrument case is adapted for mounting a chassis assembly thereto in one embodiment. The chassis assembly includes the spool support and the wire drive assembly in this embodiment. In an alternative embodiment, the method includes adapting the instrument case to hold a weld power delivery device. The weld power delivery device is disposed to receive weld power from a welding power supply and provide the weld power to the welding gun. The instrument case is adapted to receive a control panel mounted on the outside of the instrument case in an alternative embodiment.

A welding gun interface is added to the instrument case in yet another embodiment. The welding gun interface is disposed to provide the weld wire from the wire drive assembly to the welding gun. The instrument case is adapted such that the welding wire feeder is capable of operation with the instrument case closed in one other embodiment.

According to a fourth aspect of the present invention, a method of converting an instrument case into a welding wire feeder housing includes adapting the instrument case to receive weld power from a welding power source, adapting the instrument case to provide weld power to a welding gun, and adapting the instrument case to provide a weld wire to a welding gun.

The instrument case is adapted to receive shielding gas from a source of shielding gas and to provide shielding gas to a welding gun in one embodiment. The instrument case is adapted to receive a control panel in another embodiment.

According to a fifth aspect of the invention, a method of converting an instrument case into a welding wire feeder housing includes adding at least one welding input interface and at least one welding output interface to the instrument case. The at least one welding input interface is added to receive a welding input. The at least one welding output interface is added to provide a welding output.

The at least one welding input interface includes a weld power interface in one embodiment. The weld power interface is disposed to receive weld power from a welding power source. The at least one welding output interface includes a welding gun interface in another embodiment. The welding gun interface is disposed to provide welding power to a welding gun.

The at least one welding input interface includes a shielding gas interface to receive shielding gas in one embodiment. A control panel interface is added to the instrument case to receive a control panel in an alternative embodiment.

According to a sixth aspect of the invention, a modular welding wire feeder includes a housing and a chassis assembly attached to the housing. The chassis assembly includes a chassis frame and at least two welding wire feeder components attached to the chassis frame.

One of the at least two welding wire feeder components is a wire drive assembly in one embodiment. Another one of the at least two welding wire feeder components is a weld power delivery device, a spool support assembly or a circuit board in other embodiments. The at least two welding wire feeder components is at least three welding wire feeder components in one embodiment and is at least four welding wire feeder components in another embodiment. The chassis assembly is attached to the housing at four or less locations in another alternative embodiment.

Other principal features and advantages of the invention will become apparent to those skilled in the art upon review of the following drawings, the detailed description and the appended claims.

BRIEF DESCRIPTION OF THE DRAWINGS

FIG. 7 shows a front side view of a portion of the housing from the portable wire feeder of FIG. 1;

FIG. 8 shows a rear side view of the housing from the portable wire feeder of FIG. 1;

FIG. 9 shows a bottom view of the housing from the portable wire feeder of FIG. 1.

Figure 1:
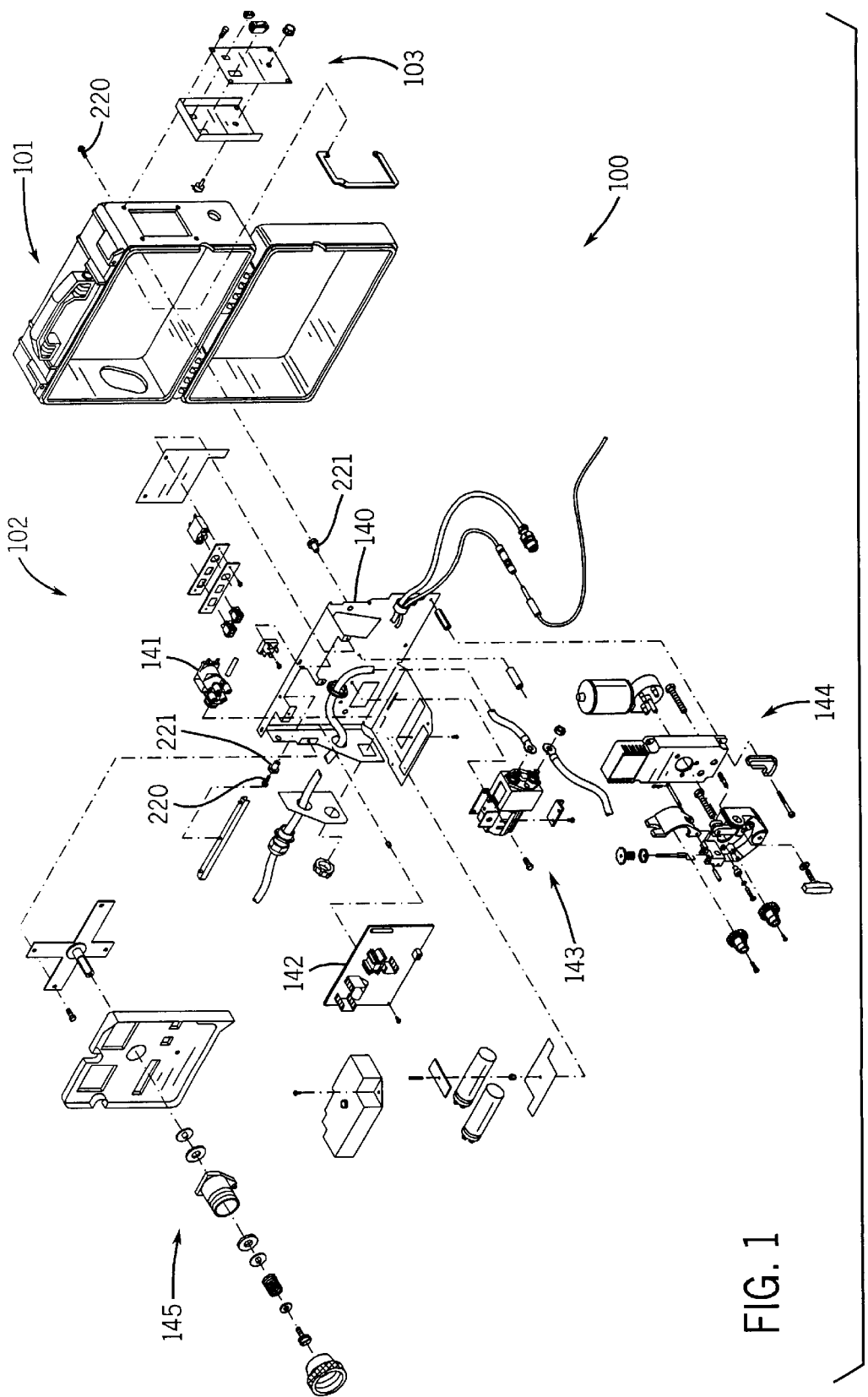
FIG. 1 shows an exploded view of a portable wire feeder according to one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding wire feeder having a particular configuration and particular features, the present invention is not limited to this configuration or to these features and other configurations and features can be used. Similarly, while the present invention will be illustrated with reference to a particular wire feeder housing and method for making the same, other wire feeder housings and other methods can be used.

Generally, the present invention involves a portable welding wire feeder housed in an instrument case or tool box. The instrument case used in the preferred embodiment is a commercially available, off-the-shelf instrument case that is intended for use in a wide variety of applications, including many applications that are outside of the welding industry.

The instrument case is adapted to hold the various welding wire feeder components that make up the wire feeder. Interfaces are provided in the case to receive the various inputs, such as weld power, shielding gas and trigger control signals. Likewise, interfaces are also provided in the instrument case to allow various outputs such as the weld wire, weld power and shielding gas to be delivered to the arc.

The welding wire feeder is used with the instrument case closed in the preferred embodiment. Or in other words, the instrument case is not simply used as a carrying case or a storage case for the welding wire feeder. Rather, the instrument case functions as a housing for the welding wire feeder in this embodiment and the welding wire feeder is used while the instrument case remains closed. In an alternative embodiment, the wire feeder normally operates with the instrument case open.

The welding wire feeder is modular in one embodiment. The various wire feeder components are mounted to a chassis frame to form a single chassis assembly in this embodiment. The chassis assembly is mounted to the inside of the instrument case housing using conventional fasteners and can be removed easily as a single unit for servicing or repair purposes. In an alternative embodiment, some or all of the various wire feeder components are separately mounted to the inside of the case using their own fasteners.

Chassis assembly as used herein means any assembly that includes two or more wire feeder components mounted to a chassis frame wherein the chassis frame is adapted for attachment to the inside of a wire feeder housing such that the entire chassis assembly can be removed from the housing as a single unit. Wire feeder component as used herein includes wire drive assemblies, spool supports, weld power delivery devices, gas valves, circuit boards, control panels, etc . . .

FIG. 1 shows an exploded view of one embodiment of the present invention. A portable welding wire feeder 100 generally includes an instrument case housing 101, a chassis assembly 102 for mounting inside of housing 101, and a control panel assembly 103 for mounting to the outside of housing 101. In an alternative embodiment, however, no external control panel is provided. Electrical harnesses (not shown) are also included for interconnecting the various electrical components of wire feeder 100.

Housing 101 is made from an off-the-shelf commercially available instrument case. The particular instrument case used in this embodiment is case model no. 1450 manufactured and sold by Pelican Products of Torrance, Calif. This particular case is an injection molded case having outside dimensions of 16⅛" L×13" W×6⅞" D and weighing 8 lbs. In alternative embodiments, the case is manufactured using different techniques including compression molding or rotational molding.

Although a particular type and size of instrument case is used in this embodiment, the present invention is not limited to this particular model or size of case and other case models and sizes can be used. In alternative embodiments, for example, the case has different overall dimensions and different weights and/or is made using different molding techniques. The present invention is also not limited to instrument cases per se. Instrument case as used herein means an instrument case, toolbox, briefcase, suitcase or other similar type of case that is commercially available off-the-shelf for use in a wide variety of applications and/or industries. Instrument case as used herein does not include cases or housings that are custom molded for specific applications or products.

Figure 2:
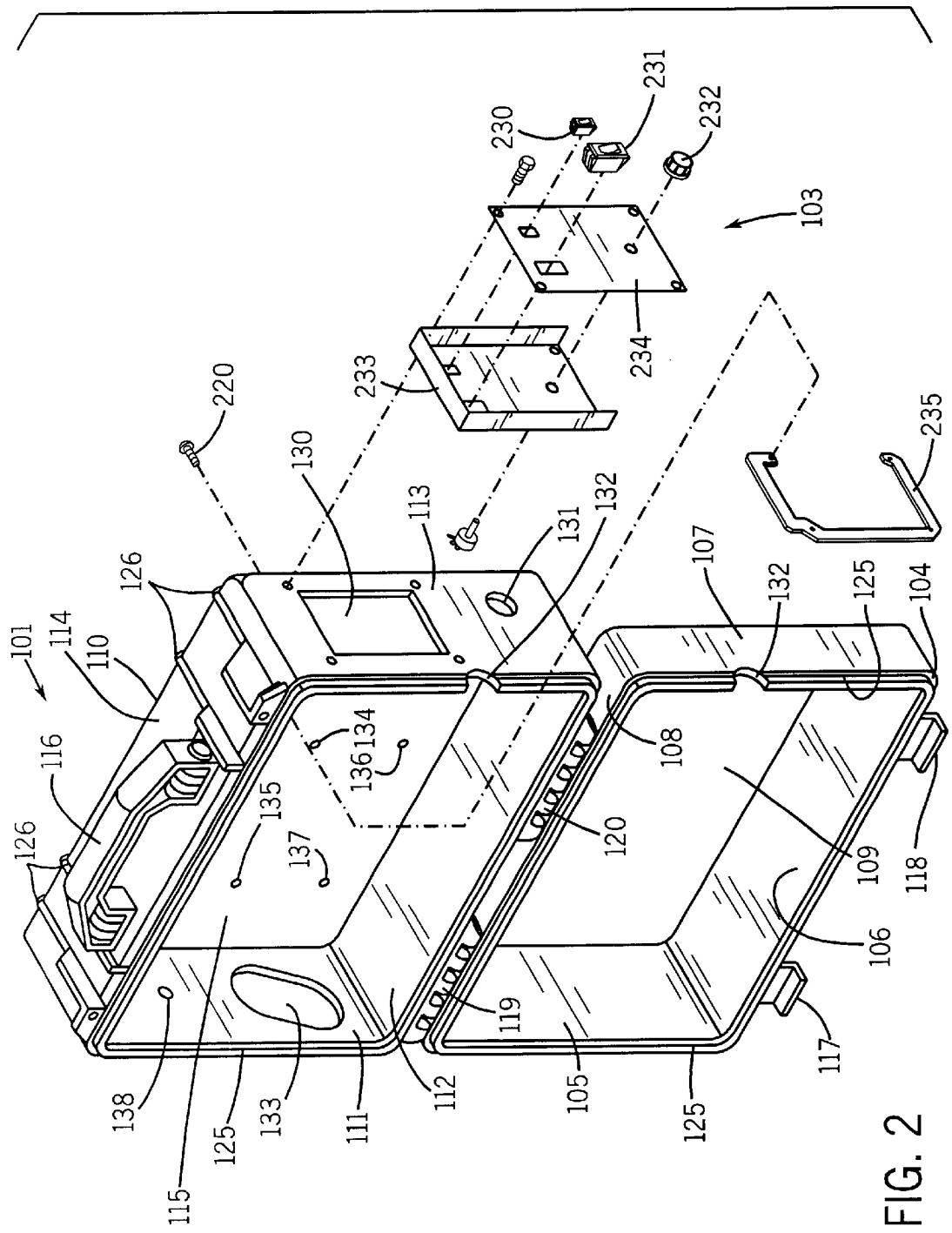
FIG. 2 shows an enlarged exploded view of the instrument case housing and the control panel assembly from the portable wire feeder of FIG. 1.

Housing 101 as shown in detail in FIG. 2 includes a three dimensional (e.g. not flat) cover 104 having four sidewalls 105–108 and a top wall 109, a three dimensional base 110 having four sidewalls 111–114 and a bottom wall 115, a handle 116 hingedly attached to base 110, a pair of latches 117–118 each of which is hingedly attached to cover 104, a pair of integrally molded hinges 119–120, and four integrally molded feet 121–124 (see FIG. 7) on the external side of bottom wall 115. The various components of housing 101, including cover 104, base 110, handle 116, latches 117–118, and hinges 119–120 are all injection molded parts in this embodiment. In alternative embodiments, some or all of these parts are rotationally molded, compression molded or made of metal or some other suitable material.

Cover 104 and base 110 mate along a mating seam 125 when instrument case housing 101 is closed. Mating seam 125 includes an O-ring seal (not shown) and is airtight and watertight in this embodiment. Mating seam 125 is airtight and watertight in this embodiment not only because of its O-ring seal, but also in part because cover 104 and base 110 are rugged, reinforced and three dimensional in shape. It is not necessary for the invention, however, that mating seam 125 be airtight or watertight and in other embodiments mating seam 125 is neither airtight nor watertight.

Handle 116 and latches 117–118 are each hingedly attached to the instrument case housing 101 using plastic or metal hinge pins. Hinges 119 and 120 are integrally molded as part of cover 104 and base 110 and the two halves of each hinge are connected together with a plastic or metal hinge pin. Reinforcement ribs 126 are integrally molded into top wall 109, bottom wall 115, and into sidewalls 106, 108, 112, and 114 of instrument case housing 101 (see FIG. 7). These ribs add extra strength to housing 101.

Several interfaces have been added to the instrument case to adapt it into housing 101. The term interface as used herein means any hole, slot or other opening (including openings that are filled with adaptors or connectors), regardless of shape, or any adaptor or connector, added to an instrument case to allow various welding inputs to be supplied to the wire feeder when the instrument case is closed (e.g welding input interfaces) and/or to allow various welding outputs to be provided from the wire feeder when the instrument case is closed (e.g welding output interfaces). Interface openings that are added to an instrument case are typically made using machining or drilling operations, however other methods can be used including cutting, sawing, punching or stamping. Welding inputs received by a wire feeder and welding outputs provided by a wire feeder can include, but are not limited to, weld power, ac power, control signals, feedback signals, sense signals, weld wire and shielding gas.

A control panel interface 130 and a trigger control interface 131, for example, have been added to front sidewall 113 of base 110 in this embodiment. A welding gun interface 132 has similarly been added to front sidewalls 107, 113 of cover 104 and base 110. A combination weld power interface and shielding gas interface 133 is provided on back sidewall 111 of base 110. These interfaces are added to the case at different locations in other embodiments. Likewise, the present invention is not limited to only these particular interfaces or this particular combination of interfaces and other interfaces and/or combinations can be added. A single interface, for example, is added to the housing case in an alternative embodiment to receive inputs and to provide outputs.

In addition to the interfaces described above, several holes 134–138 have also been added to bottom wall 115 and back sidewall 111 of base 110. Four of these holes are used as mounting holes to secure chassis assembly 102 into housing 101 in the preferred embodiment. The fifth hole is used as a drainage hole in this embodiment.

Control panel interface 130 is added to housing 101 to accommodate control panel assembly 103. Control panel interface, as used herein, means any interface added to an instrument case and disposed to allow a control panel to be mounted to the outside of the instrument case.

Control panel as used herein means any structure that includes controls, knobs or switches for controlling or adjusting the welding wire feeder including on/off switches, gas purging switches, wire feed speed adjusting controls, wire jog controls, circuit breaker reset controls, wire feed speed range switches, and welding power mode switches. Control panel as used herein also includes any structure that includes one or more meters or displays, either digital or analog, for monitoring various welding parameters.

Trigger control interface 131 is added to receive a trigger control signal from the welding gun (not shown). Trigger control interface, as used herein, means any interface added to an instrument case and disposed to allow a trigger control signal from a welding gun to be received by the welding wire feeder with the instrument case closed. In the preferred embodiment, a voltage sense signal from the workpiece is also received by wire feeder 100 through trigger control interface 131. The voltage sense signal is received through a separate interface in an alternative embodiment.

Welding gun interface 132 is added to allow for the connection of a welding gun to wire feeder 100. Welding gun interface, as used herein, means any interface added to an instrument case to allow a welding gun to be connected to the welding wire feeder with the instrument case closed. In the preferred embodiment, the weld wire, weld power and shielding gas are all delivered to the welding gun through welding gun interface 132. Shielding gas is delivered from wire feeder 100 through a separate interface in an alternative embodiment.

Welding gun interface 132 is located on (e.g. interrupts) mating seam 125 in the preferred embodiment. This is a result of the desirably small size of wire feeder 100 in this embodiment and the need to provide convenient access to the weld wire spool mounted in wire feeder 100. In alternative embodiments of the present invention where overall wire feeder size is not an issue, larger instrument cases are used for housing 101. As a result, the welding gun interface is not located on the mating seam between the cover and the base in these alternative embodiments.

Combination weld power interface and shielding gas interface 133 is provided in housing 101 to allow weld power and shielding gas to be provided to wire feeder 100. Weld power is typically supplied from a welding power source. Shielding gas is provided from a source of shielding gas such as a pressurized tank. In this embodiment, a single elongated slot is used for both the weld power interface and the shielding gas interface. Separate interfaces for weld power and shielding gas are provided in an alternative embodiment. In another alternative embodiment, the wire feeder is not adapted to receive shielding gas and no shielding gas interface is provided.

Weld power interface, as used herein, means any interface added to an instrument case and disposed to allow weld power to be received by the welding wire feeder with the instrument case closed. Shielding gas interface, as used herein, means any interface added to an instrument case and disposed to allow shielding gas to be received by the welding wire feeder with the instrument case closed.

Figure 3:
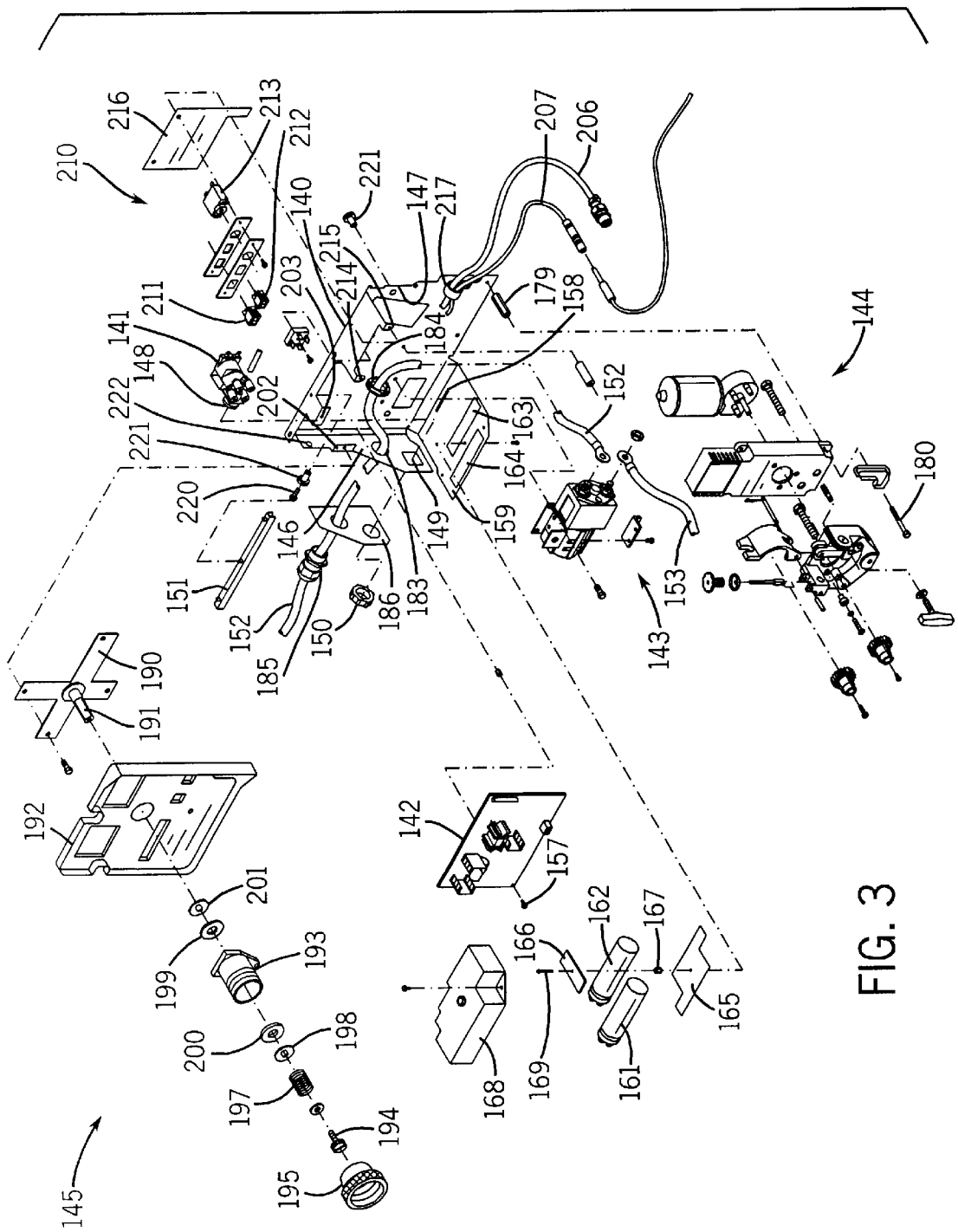
FIG. 3 shows an enlarged exploded view of the chassis assembly from the portable wire feeder of FIG. 1.

Chassis assembly 102 as shown in exploded fashion in FIG. 3 includes a chassis frame 140 having several wire feeder components mounted thereto. These components are mounted to chassis frame 140 outside of housing 101 in this embodiment. The entire chassis assembly is then installed in, and mounted to, housing 101 as a single unit. The individual wire feeder components are mounted separately to housing 101 in an alternative embodiment and no chassis assembly is provided.

The particular wire feeder components mounted to chassis frame 140 in this embodiment include a gas valve 141, a circuit board subassembly 142, a contactor subassembly 143, a wire drive subassembly 144 and a spool support subassembly 145. Various other wire feeder components are mounted to chassis frame 140 in other embodiments. In one embodiment, for example, only a wire drive assembly and a spool support are mounted to chassis frame 140. In other embodiments, chassis assembly 102 includes a different assortment of wire feeder components and has at least two, three, four or five wire feeder components mounted to chassis frame 140.

Gas valve 141 is a solenoid type gas valve in this embodiment. Other types of gas valves, however, can be used. Gas valve 141 is mounted to a tab 146 that extends perpendicularly upward from a bottom portion 147 of chassis frame 140. Gas valve 141 includes a threaded portion 148 that extends through a square hole 149 in tab 146. A nut 150 is threaded onto threaded portion 148 to secure gas valve 141 to tab 146. Gas valve 141 is aligned with shielding gas interface 133 when chassis 102 is mounted in housing 101.

Circuit board subassembly 142, which is also mounted to chassis frame 140, provides wire feed speed control for wire drive assembly 144. Circuit board subassembly 142 also controls gas valve 141 and contactor subassembly 143 in this embodiment. In an alternative embodiment, no circuit board subassembly is included in wire feeder 100. Circuitry to control other aspects of the welding process is housed in welding wire feeder 100 in other embodiments, including circuitry to control weld wire jog.

Circuit board subassembly 142 is mounted to chassis frame 140 using a plastic channel guide 151 and two mounting screws 157 (only one of which is shown). One edge of circuit board subassembly 142 is slid into channel guide 151 and then mounting screws 157 are used to secure circuit board subassembly 142 to bottom portion 147 of chassis frame 140.

Figure 6:
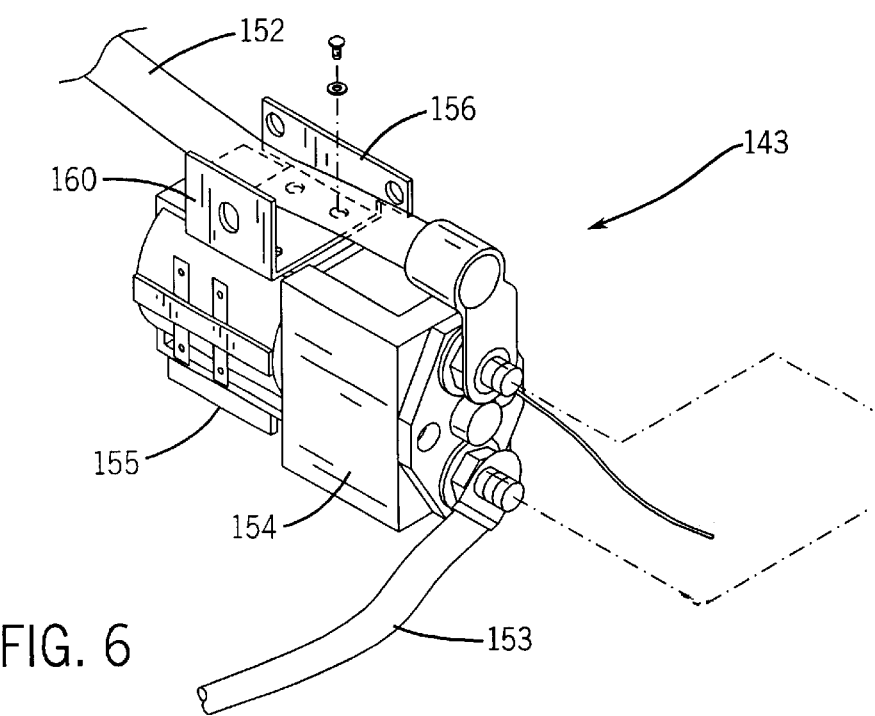
FIG. 6 shows an isometric view of the contactor subassembly from the portable wire feeder of FIG. 1.
Figure 10:
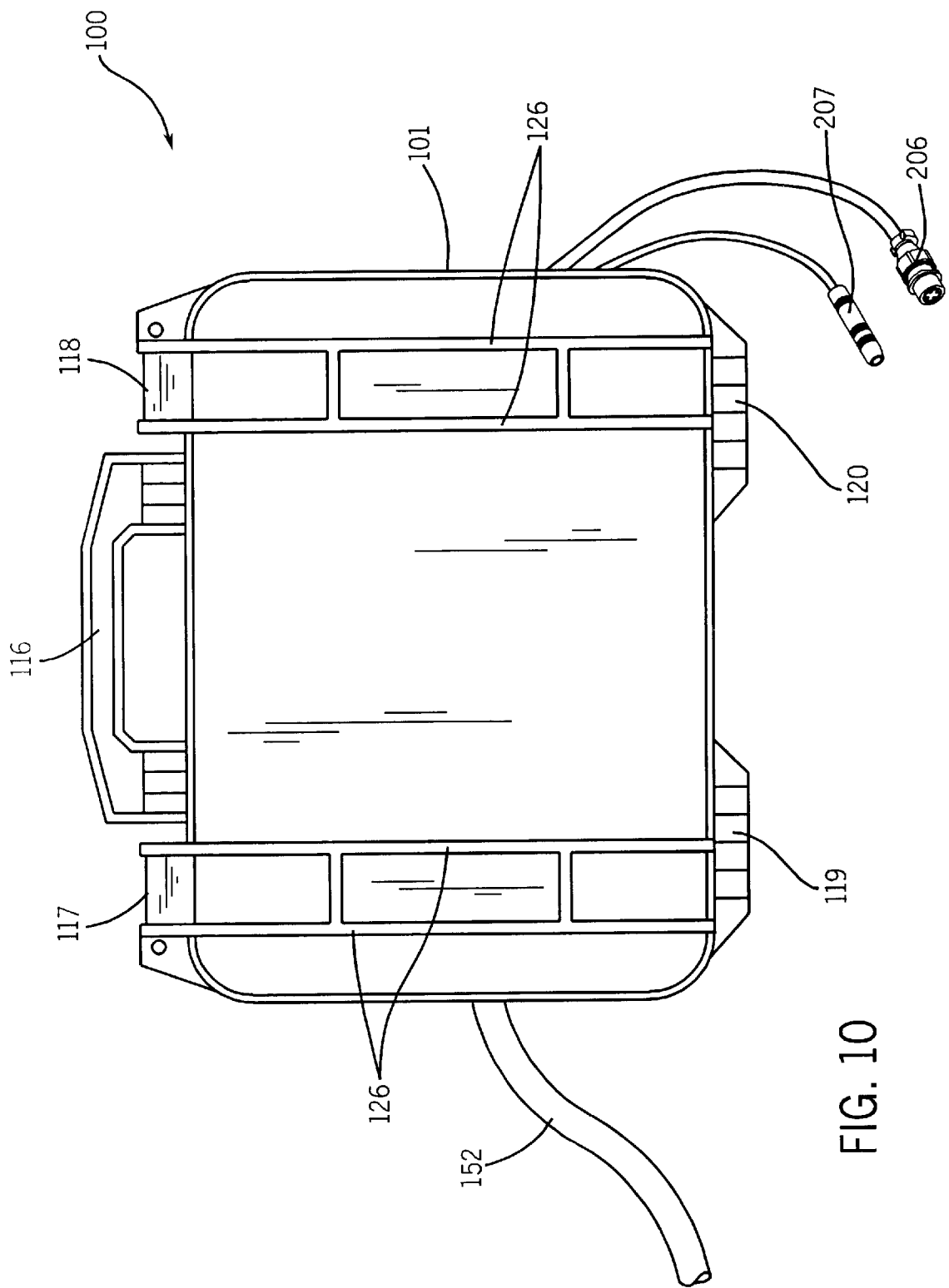
FIG. 10 shows a complete side view of the portable wire feeder of FIG. 1.

Contactor subassembly 143 acts as a weld power delivery device between the welding power supply and the welding gun. Contactor subassembly 143 in this embodiment as shown in detail in FIG. 6 includes a power switch 154, a first electrical cable 152 and a second electrical cable 153. One end of cable 152 is electrically connected to one side of switch 154. The other end of cable 152 is intended for electrical connection to a weld cable from the welding power supply.

In a similar manner, one end of cable 153 is electrically connected to the other side of switch 154 in this embodiment. The other end of cable 153 is electrically connected to wire drive assembly 144. Cable 153 delivers weld power from switch 154 to the welding gun via wire drive assembly 144 (e.g. cable 153 is electrically connected to the cast aluminum drive head of wire drive assembly 144 in this embodiment and weld power is provided to the welding gun via the drive head).

Figure 4A:
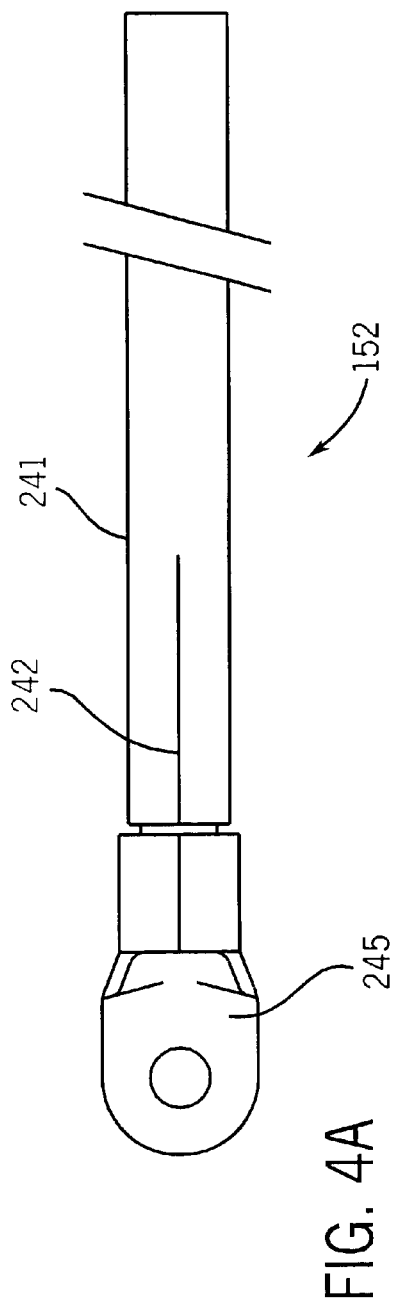
FIGS. 4A–B show various views of a cable assembly from the portable wire feeder of FIG. 1.
Figure 4B:
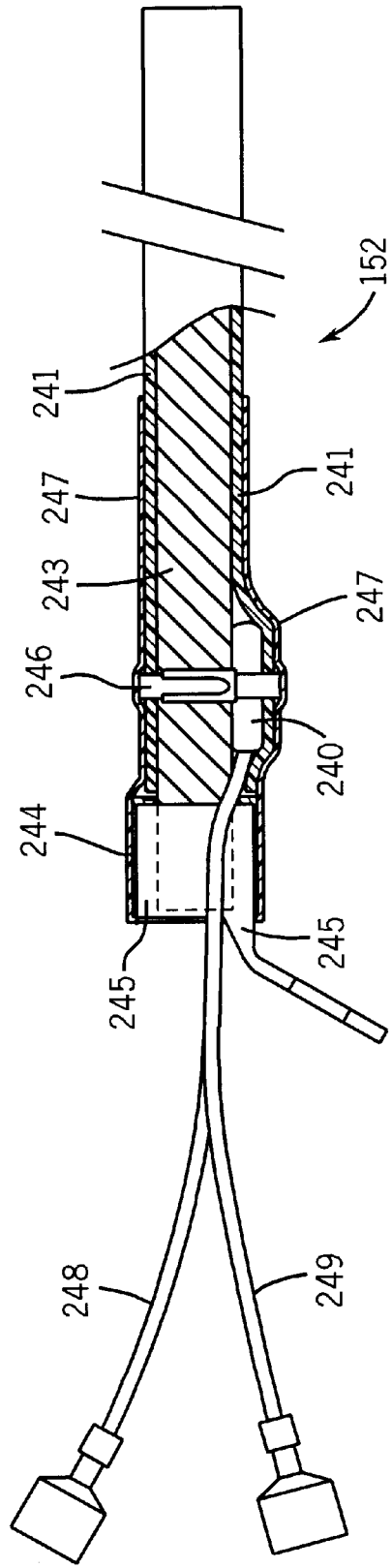

A thermostat 240 (see FIGS. 4A–B) is placed inside of jacket 241 of cable 152 to monitor the conductor temperature of cable 152 in the preferred embodiment. Thermostat 240 is installed in cable 152 in the following manner. A slit 242 is first made in jacket 241 and the jacket is rolled back to expose copper cable 243. A piece of heat shrink 244 is then placed over lug 245 and shrunk in place. Next, thermostat 240 is placed under jacket 241 and directly on copper cable 243 at a location opposite slit 242. Jacket 241 is then rolled back over thermostat 240. A clamp 246 is placed over jacket 241 and is centered on thermostat 240. Clamp 246 holds thermostat 240 tight against copper cable 243. Finally, heat shrink tube 247 is placed over the thermostat assembly and shrunk in place.

Thermostat 240 is provided to detect overheating of cable 152 in the event that contactor subassembly 143 fails. Leads 248 and 249 of thermostat 240 are electrically connected in series with trigger lead 206. Thus, if overheating is detected, the thermostat will open up the trigger lead circuit and no weld power will be provided to the welding gun. Although a thermostat is provided in this embodiment of the invention, in other embodiments no thermostat is used.

Contactor subassembly 143 also includes two mounting brackets 155, 156. Mounting brackets 155, 156 attach contactor subassembly 143 to chassis frame 140. Bracket 155 includes a tab that is inserted into a slot 158 on a tab 159. Tab 159 extends perpendicularly upward from bottom portion 147 of chassis frame 140. With the tab on bracket 155 inserted into slot 158, mounting bracket 156 is secured to chassis frame 140 using two mounting screws (not shown). Bracket 156 also includes a mounting tab 160 used for mounting spool support subassembly 145 to chassis frame 140 as will be more fully described herein.

The end of cable 152 is fed through a hole 183 in tab 146 and through a hole in an insulating plastic piece 186. A strain relief collar 184 and a nut 185 (see FIG. 3) secure cable 152 to chassis frame 140. This completes the installation of contactor subassembly 143 in chassis assembly 102.

In alternative embodiments, no contactor or switch is provided and the weld power delivery device between the welding power supply and the welding gun is simply an electrical conductor or conductors. For example, one end of cable 152 is attached directly to wire drive assembly 144 in this alternative embodiment and cable 152 in combination with wire drive assembly 144, act as the weld power delivery device in wire feeder 100 between the power supply and the welding gun.

A pair of electrolytic storage capacitors 161, 162 are mounted just above contactor subassembly 143 in rectangular holes 163, 164 on tab 159. These capacitors store excess energy during switching of contactor switch 154. A thin sheet of mylar film 165 is placed between the capacitors and tab 159 for insulation purposes.

Capacitors 161, 162 are held in place using a polyester glass laminate bar 166 placed across the top of the capacitors opposite tab 159. Bar 166 is connected to tab 159 using a screw 169 and a standoff 167 located between the capacitors. A plastic shroud 168 mounted to chassis frame 140 covers capacitors 161, 162 in this embodiment.

Figure 5:
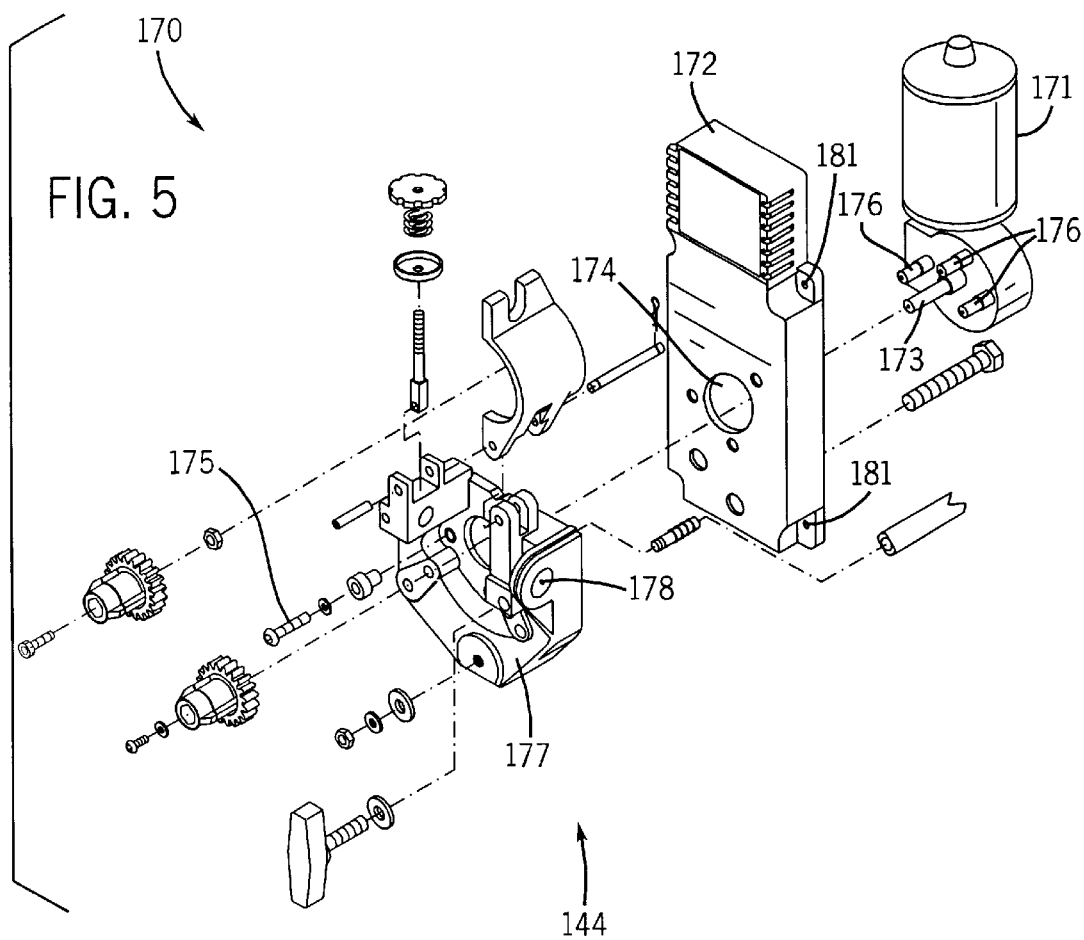
FIG. 5 shows an enlarged exploded view of the wire drive subassembly from the portable wire feeder of FIG. 1.

Wire drive subassembly 144 as shown in detail in FIG. 5 includes a drive head 170, a feed motor 171 and a plastic motor housing 172. The output shaft 173 of feed motor 171 is operatively connected to drive head 170 through a hole 174 in plastic housing 172. Feed motor 171 is secured to wire drive assembly 170 using three mounting bolts 175 (only one of which is shown in FIG. 5) threaded into standoffs 176.

Weld power is provided to the cast aluminum portion 177 of drive head 170 from contactor switch 154 via cable 153. Weld power and the weld wire are provided from wire drive assembly 144 to the welding gun from a welding gun adapter 178. Welding gun adapter 178 is aligned with welding gun interface 132 when chassis assembly 102 is mounted in housing 101.

Wire drive subassembly 144 is mounted to chassis frame 140 using four plastic threaded standoffs 179 and four mounting bolts 180 (one of each is shown in FIG. 3). Each of the four mounting bolts 179 is inserted through a hole in plastic motor housing 172 (two of which are shown in FIG. 5 as holes 181).

Wire spool support subassembly 145 as shown in FIG. 3 includes a spool support frame 190, a spindle 191, a protective shroud 192, a spool hub 193, a brake adjustment knob 194 and a hub nut 195. Spindle 191 is mounted to spool support frame 190 using a nut (not shown) on the back side of spool support frame 190. Spool hub 193 is secured to spindle 191 by threading brake adjustment knob 194 into the end of spindle 191. A tension spring 197 and several fibre friction washers 198, 199 and anti-turn bearing washers 200, 201 are also mounted on spindle 191 as part of the braking system for spool support subassembly 145.

A spool of weld wire is placed over spool hub 193 and is held in place by hub nut 195. Hub nut 195 is tapered in this embodiment. The taper forces the spool of wire to be centered on hub 193 as the hub nut is threaded onto the hub. The spool of weld wire mounted on spool support 145 provides the weld wire to wire drive assembly 144 and is accessible to the operator with instrument case housing 101 open (e.g. cover 104 is open).

Spool support subassembly 145 is mounted to chassis frame 140 above circuit board subassembly 142 at four locations in this embodiment. Two of the legs of spool support frame 190 are mounted to tabs 202, 203 on chassis frame 140 (see FIG. 3). A third leg of spool support frame 190 is mounted to tab 160 on bracket 156 of contactor subassembly 143. The final leg of spool support frame 190 is mounted to chassis frame 140 using one of the standoffs 179 and mounting bolts 180 used to mount wire drive assembly 144 to chassis frame 140.

Chassis assembly 102 also includes an internal control panel 210 in this embodiment. Control panel 210 includes a switch 211 for selecting between constant voltage and constant current modes of welding, a switch 212 for switching between high and low wire feed speed ranges and a circuit breaker reset push button 213. These particular controls are located inside of wire feeder 100 because they are generally set at the start of a welding operation and typically do not need to be adjusted or changed during welding. In alternative embodiments, other control buttons and switches are provided inside of wire feeder 100. In yet another alternative embodiment, no internal control panel is provided.

Control panel 210 is mounted to chassis frame 140 using two mounting tabs 214, 215 each of which extend perpendicularly upward from bottom portion 147 of chassis frame 140. A plastic shroud 216 is mounted between control panel 210 and wire drive assembly 144 to protect the operator from various wiring harnesses that are located in wire feeder 100.

A trigger control lead cable 206 and a voltage sense lead cable 207 (see FIG. 3) are mechanically attached to chassis frame 140 using a plastic clip 217. These two leads are electrically connected to circuit board subassembly 142 using an electrical harness (also not shown).

Chassis frame 102 with all of the previously described components mounted thereon is mounted to the inside of housing 101 as a single assembled unit in the housing 101 for mounting.

Four mounting screws 220 (only two of which are shown in FIG. 1) secure chassis assembly 102 inside of housing 101. Three of the mounting screws are inserted through mounting holes 134–136 (see FIG. 7) in the bottom wall 115 of base 110. The other mounting screw 220 is inserted in hole 138 in back wall 111 of base 110 and passes through a hole 222 in tab 146 that is part of chassis frame 140.

Four rubber shoulder washers 221 (only two of which are shown in FIG. 1) are positioned in holes (one of which is hole 222) in chassis frame 140 between chassis frame 140 and base 110. Rubber shoulder washers 221 include a threaded insert at their ends. When each mounting screw 220 is threaded into its accompanying rubber shoulder washer 221, the rubber shoulder washer is compressed and expands in its hole in chassis frame 140 thereby securing chassis frame 140 in place in housing 101. Rubber shoulder washers 221 provide both shock absorbency and electrical insulation for chassis assembly 102.

Although screws and shoulder washers are used in this embodiment to mount chassis assembly 102 into housing 101, the present invention is not limited to these type of fasteners. In other embodiments, for example, bolts, nuts, conventional washers, glue, adhesive pads, rivets or velcro pads, or any combination of these, are used to mount chassis assembly 102 to housing 101. Likewise, in other embodiments, chassis assembly 102 is mounted to housing 101 at more or less than four locations including two, three, five and more than five locations.

With chassis assembly 102 mounted in housing 101, the various components of chassis assembly 102 are automatically in alignment with the various interfaces that are provided in housing 101. For example, gas valve 141 is aligned with shielding gas interface slot 133 such that a shielding gas cable (not shown) can be connected from the outside of housing 101 to supply shielding gas to wire feeder 100. Weld cable 152, likewise, protrudes through weld power interface slot 133 such that a weld cable from the welding power supply can be electrically connected to cable 152 to supply weld power to wire feeder 100.

With respect to outputs, wire drive assembly 144 includes a gun adapter 178 in alignment with welding gun interface 132 to allow for the external connection of a welding gun (not shown). Similarly, trigger control cable 206 and voltage sense lead 207 extend out through trigger control interface 131 to allow for connection of a welding gun trigger cable and a voltage sensing cable from the workpiece being welded.

In alternative embodiments, one or more of the interfaces openings are filled with an adaptor or connector. For example, in one embodiment, the weld power interface opening is filled with either a male or female connector and cable 152 is internally connected to the connector. A weld cable from a welding power supply having a mating connector on its end is then connected externally to the connector to supply weld power to wire feeder 100. In other embodiments, other interfaces including the welding gun interface, the trigger control interface and the shielding gas interface include connectors or adaptors.

Control panel assembly 103 is mounted to housing 101 separate from chassis assembly 102 in this embodiment. Control panel assembly 103 as shown in FIG. 2 includes a panel 233, a power on/off switch 230, a purge control switch 231 for purging shielding gas from gas valve 141, a wire feed speed control knob 232 for adjusting wire feed speed and a nameplate 234. Control panel 103 includes one or more meters or displays, either digital or analog, in an alternative embodiment, for monitoring various welding parameters.

Control panel 103 is mounted to the outside of housing 101 at control panel interface 130 using four mounting screws. These mounting screws pass through holes in housing 101 and are threaded into holes in a c-shaped backing plate 235 that is positioned on the inside of housing 101 adjacent to front sidewall 113 of base 110.

Finally, it should be noted that the modularity of wire feeder 100 makes it easy to manufacture, service and repair. Chassis assembly 102 is initially built and tested outside of housing 101 and is installed in housing 101 as a complete assembly using four mounting screws 220 in this embodiment. Removal of chassis assembly 102 from housing 101 for servicing and repair, likewise, requires the removal of only those four mounting screws (e.g. screws 220). Screws 220 can easily be installed or removed from the outside of wire feeder 100. After removal, chassis assembly 102 can be mounted into a new replacement housing 101 or it can be placed on a bench or table for testing and servicing.

Numerous modifications may be made to the present invention which still fall within the intended scope hereof. Thus, it should be apparent that there has been provided in accordance with the present invention a portable welding wire feeder and a method of modifying an instrument case to house a welding wire feeder that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A portable welding wire feeder comprising:
   a plastic instrument case having a housing with a carrying handle, a hinge, and a latch which are injection molded;
   a spool support assembly mounted in the instrument case and disposed to support a spool of weld wire; and
   a wire drive assembly mounted in the instrument case and disposed to receive the weld wire from the spool and provide the weld wire to a welding gun.

2. The portable welding wire feeder of claim 1 further including a chassis assembly mounted to the instrument case wherein the chassis assembly includes the spool support assembly and the wire drive assembly.

3. The portable welding wire feeder of claim 1 wherein the instrument case includes at least one welding input interface disposed to receive a welding input.

4. The portable welding wire feeder of claim 1 wherein the instrument case includes at least one welding output interface disposed to provide a welding output.

5. The portable welding wire feeder of claim 1 further including a control panel mounted on the outside of the instrument case.

6. The portable welding wire feeder of claim 1 further including a weld power delivery device mounted in the instrument case and disposed to receive weld power from a welding power supply and provide the weld power to the welding gun.

7. The portable welding wire feeder of claim 1 wherein the instrument case includes a welding gun interface and the wire drive assembly is disposed to provide the weld wire to the welding gun through the welding gun interface.

8. The portable welding wire feeder of claim 7 wherein the instrument case includes a cover and a base connected to the cover wherein the cover and the base open and close along a mating seam and further wherein the welding gun interface interrupts the mating seam.

9. The portable welding wire feeder of claim 1 wherein the welding wire feeder is capable of operation with the instrument case closed.

10. A housing for a portable welding wire feeder comprising:
    plastic instrument case having a cover and a base connected to the cover wherein the cover and the base open and close along a mating seam, a carrying handle, and a latch which are all injection molded;
    at least one welding input interface one the instrument case disposed to receive a welding input; and
    at least one welding output interface on the instrument case disposed to provide a welding output.

11. The housing of claim 10 wherein the at least one welding input interface includes a weld power interface disposed to receive weld power from a welding power source.

12. The housing of claim 10 wherein the at least one welding output interface includes a welding gun interface disposed to provide weld power to a welding gun.

13. The housing of claim 12 wherein the welding gun interface interrupts the mating seam.

14. The housing of claim 10 wherein the at least one welding input interface includes a shielding gas interface disposed to receive shielding gas from a source of shielding gas.

15. The housing of claim 10 further including a control panel interface on the instrument case disposed to receive a control panel.

16. A method of modifying a plastic instrument case to house a welding wire feeder, the instrument case having a housing with a carrying handle, a hinge, and a latch which are injection molded, the method comprising the steps of:

adapting the instrument case to hold a spool support assembly disposed to support a spool of weld wire; and adapting the instrument case to hold a wire drive assembly disposed to receive the weld wire from the spool and provide the weld wire to a welding gun.

17. The method of claim 16 further including adapting the instrument case for mounting a chassis assembly thereto wherein the chassis assembly includes the spool support assembly and the wire drive assembly.

18. The method of claim 16 further including adapting the instrument case to hold a weld power delivery device disposed to receive weld power from a welding power supply and provide the weld power to the welding gun.

19. The method of claim 16 further including adapting the instrument case to receive a control panel mounted on the outside of the instrument case.

20. The method of claim 16 further including adding a welding gun interface to the instrument case wherein the welding gun interface is disposed to provide the weld wire from the wire drive assembly to the welding gun.

21. The method of claim 16 wherein the instrument case is further adapted such that the welding wire feeder is capable of operation with the instrument case closed.

22. A method of converting a plastic instrument case having a housing with a carrying handle, a hinge, and a latch which are injection molded into a welding wire feeder housing comprising the steps of:

adapting the instrument case to receive weld power from a welding power source;

adapting the instrument case to provide weld power to a welding gun; and adapting the instrument case to provide a weld wire to a welding gun.

23. The method of claim 22 further including adapting the instrument case to receive shielding gas from a source of shielding gas and to provide shielding gas to a welding gun.

24. The method of claim 22 further including adapting the instrument case to receive a control panel.

25. A method of converting a plastic instrument case having a housing with a carrying handle, a hinge, and a latch which are injection molded into a welding wire feeder housing comprising the steps of:

adding at least one welding input interface to the instrument case to receive a welding input; and adding at least one welding output interface to the instrument case to provide a welding output.

26. The method of claim 25 wherein the at least one welding input interface includes a weld power interface disposed to receive weld power from a welding power source.

27. The method of claim 25 wherein the at least one welding output interface includes a welding gun interface disposed to provide weld power to a welding gun.

28. The method of claim 25 wherein the at least one welding input interface includes a shielding gas interface disposed to receive shielding gas.

29. The method of claim 25 further including adding a control panel interface to the instrument case to receive a control panel.

30. A welding wire feeder comprising:

a housing; and a modular chassis assembly wherein the chassis assembly includes a chassis frame and at least two welding wire feeder components attached to the chassis frame, the modular chassis assembly being mounted to the housing as a single unit.

31. The modular welding wire feeder of claim 30 wherein the at least two welding wire feeder components includes a wire drive assembly.

32. The modular welding wire feeder of claim 31 wherein the at least two welding wire feeder components further includes a weld power delivery device.

33. The modular welding wire feeder of claim 31 wherein the at least two welding wire feeder components further includes a spool support assembly.

34. The modular welding wire feeder of claim 31 wherein the at least two welding wire feeder components further includes a circuit board.

35. The modular welding wire feeder of claim 30 wherein the at least two welding wire feeder components is at least three welding wire feeder components.

36. The modular welding wire feeder of claim 30 wherein the at least two welding wire feeder components is at least four welding wire feeder components.

37. The modular welding wire feeder of claim 30 wherein the chassis assembly is attached to the housing at four or less locations.

* * * * *